United States Patent
Chen

(10) Patent No.: US 8,398,307 B2
(45) Date of Patent: Mar. 19, 2013

(54) BEARING DEVICE

(75) Inventor: Bin Chen, Shenzhen (CN)

(73) Assignee: Asia Vital Components (Shen Zhen) Co., Ltd., Shenzhen (CN)

( * ) Notice: Subject to any disclaimer, the term of this patent is extended or adjusted under 35 U.S.C. 154(b) by 62 days.

(21) Appl. No.: 13/182,712

(22) Filed: Jul. 14, 2011

(65) Prior Publication Data

US 2013/0016932 A1 Jan. 17, 2013

(51) Int. Cl.
*F16C 32/06* (2006.01)
*F16C 33/10* (2006.01)
*F16N 15/00* (2006.01)

(52) U.S. Cl. ......... 384/100; 384/322; 384/410; 384/413
(58) Field of Classification Search ................... 384/100, 384/104, 107, 113–114, 119, 322, 410, 413, 384/462; 310/67 R, 90
See application file for complete search history.

(56) References Cited

U.S. PATENT DOCUMENTS

| | | | | |
|---|---|---|---|---|
| 3,184,272 A * | 5/1965 | Ridgway, Jr. | ................. | 384/408 |
| 3,212,829 A * | 10/1965 | Gross | ............................... | 384/12 |
| 3,434,765 A * | 3/1969 | Abel | ............................. | 384/413 |
| 4,008,788 A * | 2/1977 | Whitt | ............................... | 184/12 |
| 4,308,478 A * | 12/1981 | Mertz | ............................... | 310/90 |
| 4,955,791 A * | 9/1990 | Wrobel | ........................... | 310/90 |
| 5,610,462 A * | 3/1997 | Takahashi | ....................... | 310/90 |
| 5,925,949 A * | 7/1999 | Jung et al. | .................... | 310/67 R |
| 6,084,328 A * | 7/2000 | Yamashita et al. | .............. | 310/90 |
| 6,954,017 B2 * | 10/2005 | Takahashi et al. | .............. | 310/90 |
| 7,109,620 B2 * | 9/2006 | Fujii et al. | ........................ | 310/90 |
| 7,498,704 B2 * | 3/2009 | Otsuki et al. | .................. | 310/90.5 |
| 2004/0190802 A1 * | 9/2004 | Gomyo et al. | ................ | 384/100 |
| 2005/0058374 A1 * | 3/2005 | Gomyo et al. | ................ | 384/119 |

FOREIGN PATENT DOCUMENTS

| | | | | |
|---|---|---|---|---|
| JP | 03198637 A | * | 8/1991 |
| JP | 05344675 A | * | 12/1993 |
| JP | 07199105 A | * | 8/1995 |
| JP | 08098447 A | * | 4/1996 |
| JP | 10030640 A | * | 2/1998 |

* cited by examiner

*Primary Examiner* — Marcus Charles

(57) ABSTRACT

A bearing device comprises a bearing fixing base, a hub, an oil seal bush, and an oily felt. The bearing fixing base is fixedly joined with a tubular support; the hub is fixedly joined with a rotor spindle which extends into the tubular support and rotates with respect to the tubular support; the oil seal bush is disposed between the spindle and the tubular support with a receiving clearance being defined between the oil seal bush and the tubular support; the oily felt is disposed in the receiving clearance. The oily felt supplies lubrication oil to lubricate the oil seal bush for prolonging a life span of the bearing device.

4 Claims, 3 Drawing Sheets

BEARING DEVICE

BACKGROUND OF THE INVENTION

1. Field of the Invention

The present invention is related to a bearing device, and particularly to a bearing device with which supply of lubrication oil is maintained constantly, friction resistance therein is reduced substantially, and life span thereof is prolonged.

2. Brief Description of the Related Art

Various electronic devices, such as home appliances, computers, and consumer type and commercial type communication devices, have been largely employed in our current daily lives. Usually, the electronic devices, which provide huge and complicated hardware and software, is embedded with high-level and multiple processing circuits or chips, and it is necessary to keep the electronic components at the normal operation temperature in order to avoid shortened life spans or damages due to extraordinary high temperature. Generally, the most popular way to maintain the electronic components at the normal operation temperature is using fans for achieving the purpose.

Referring to FIG. 1, the conventional bearing device is illustrated. It can be seen in FIG. 1 that the conventional bearing device 9 includes a bearing fixing base 91, a hub 92, and an oil seal bush 94. The bearing fixing base 91 further includes a tubular member 918. A spindle 921 is disposed in the center of the hub 92, and a plurality of blades 922 are disposed at the circumference of the hub 92; usually, the hub 92, the spindle 921, and the blades 922 are made integrally as single piece for intensifying the mechanical strength thereof and easily being fabricated. The oil seal bush 94 is disposed between the spindle and the tubular member 918, and a receiving clearance 96 is formed between the oil seal bush 94 and the tubular member 918 for containing the lubrication oil. Under the circumferences, the oil seal bush 94 and the hub 92 with the blades 922 are capable of rotating with respect to the bearing fixing base 91 after the spindle 921 is inserted into the tubular member 918. In this way, the conventional bearing device 9 acts as a fan to blow the air to dissipate heat generated from the electronic components.

However, the conventional bearing device 9 has a deficiency that the oil seal bush 94 is wear and tear seriously due to external dusts entering the receiving clearance 96 and volatilization of the lubrication oil gradually. As a result, problems such as the rotational speed of the fan becoming much slower, and the noise during the rotation of the fan increasing significantly; moreover, fierce vibrations are caused by the fan runs under unbalancing rotation due to the spindle 921 being worn out. Accordingly, the actual life span of the bearing device 9 is shorter than that is expected.

Hence, how to solve the preceding problems of conventional bearing device 9 is a subject worth us to care, and the present invention is proposed for the subject.

SUMMARY OF THE INVENTION

Accordingly, in order to overcome the preceding disadvantages of the prior art, an object of the present invention is to provide a bearing device with which the external dusts is blocked and the problem with regard to volatilization of lubrication oil is improved.

Another object of the present invention is to provide a bearing device which provides a prolonged life span.

For achieving the preceding objects, the bearing device according to the present invention comprises a bearing fixing base, a hub, an oil seal bush, and an oily felt; the bearing fixing base is fixedly joined with a tubular support; the hub is fixedly joined with a rotor spindle which extends into the tubular support and rotates with respect to the tubular support; the oil seal bush is disposed between the spindle and the tubular support with a receiving clearance being defined between the oil seal bush and the tubular support; the oily felt is disposed in the receiving clearance; the oily felt supplies lubrication oil to lubricate the oil seal bush for prolonging the life span of the bearing device.

In the preferred embodiment of the present invention, the receiving clearance is disposed at an axial end of the oil seal bush.

In the preferred embodiment of the present invention, the hub is disposed at the circumference of the tubular support.

In the preferred embodiment of the present invention, the bearing device further comprises a cap seal fixedly joined to an axial end of tubular support; the cap seal and the hearing fixing base hold two axial ends respectively.

In the preferred embodiment of the present invention, the bearing device further comprises a cap seal fixedly joined to an axial end of tubular support; the receiving clearance is disposed at another axial end of the oil seal bush opposite to the cap seal.

In the preferred embodiment of the present invention, the tubular support extends outward and is integrally made with the bearing fixing base as a single piece.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
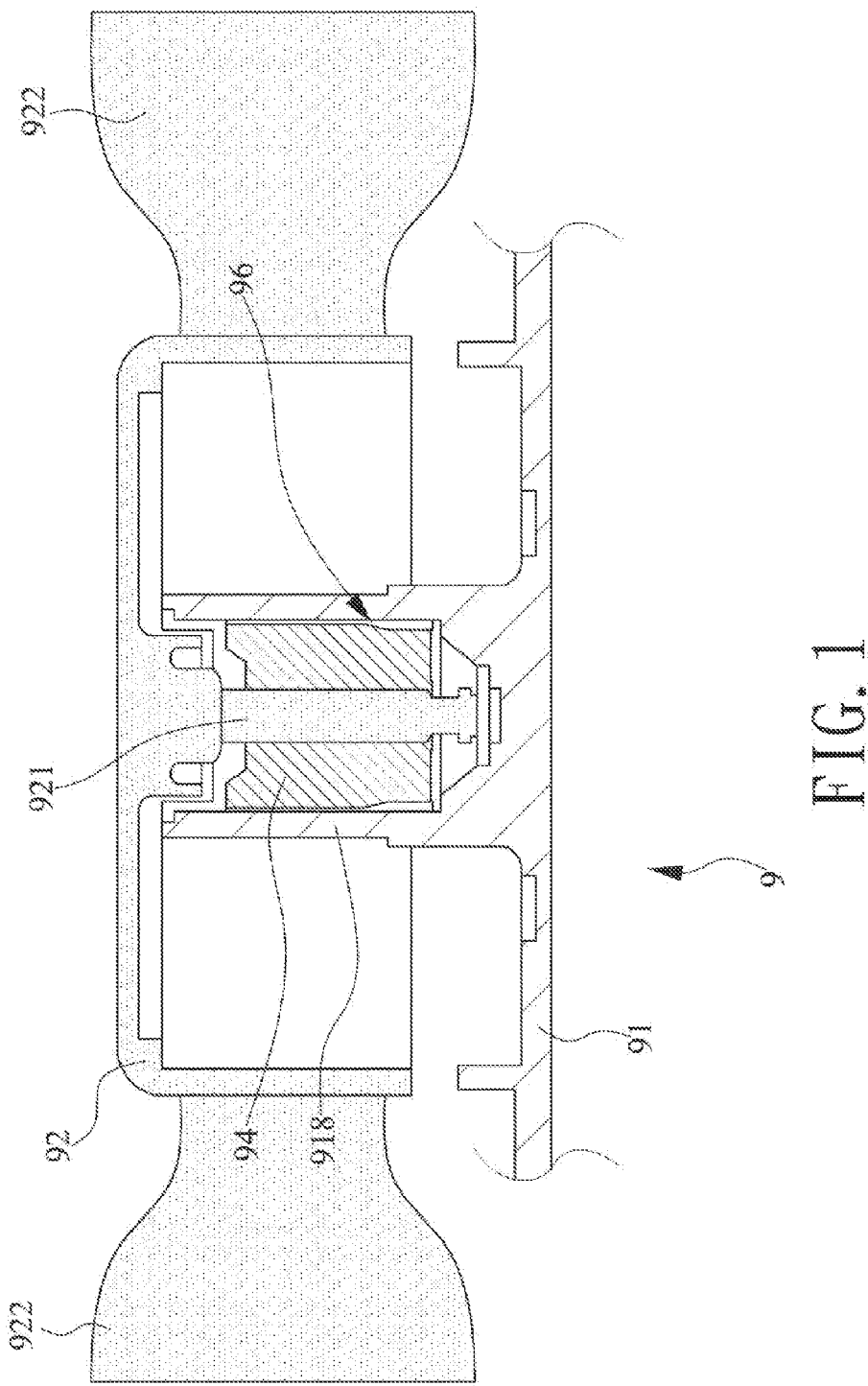
FIG. 1 is a sectional view of the conventional bearing device.
Figure 2:
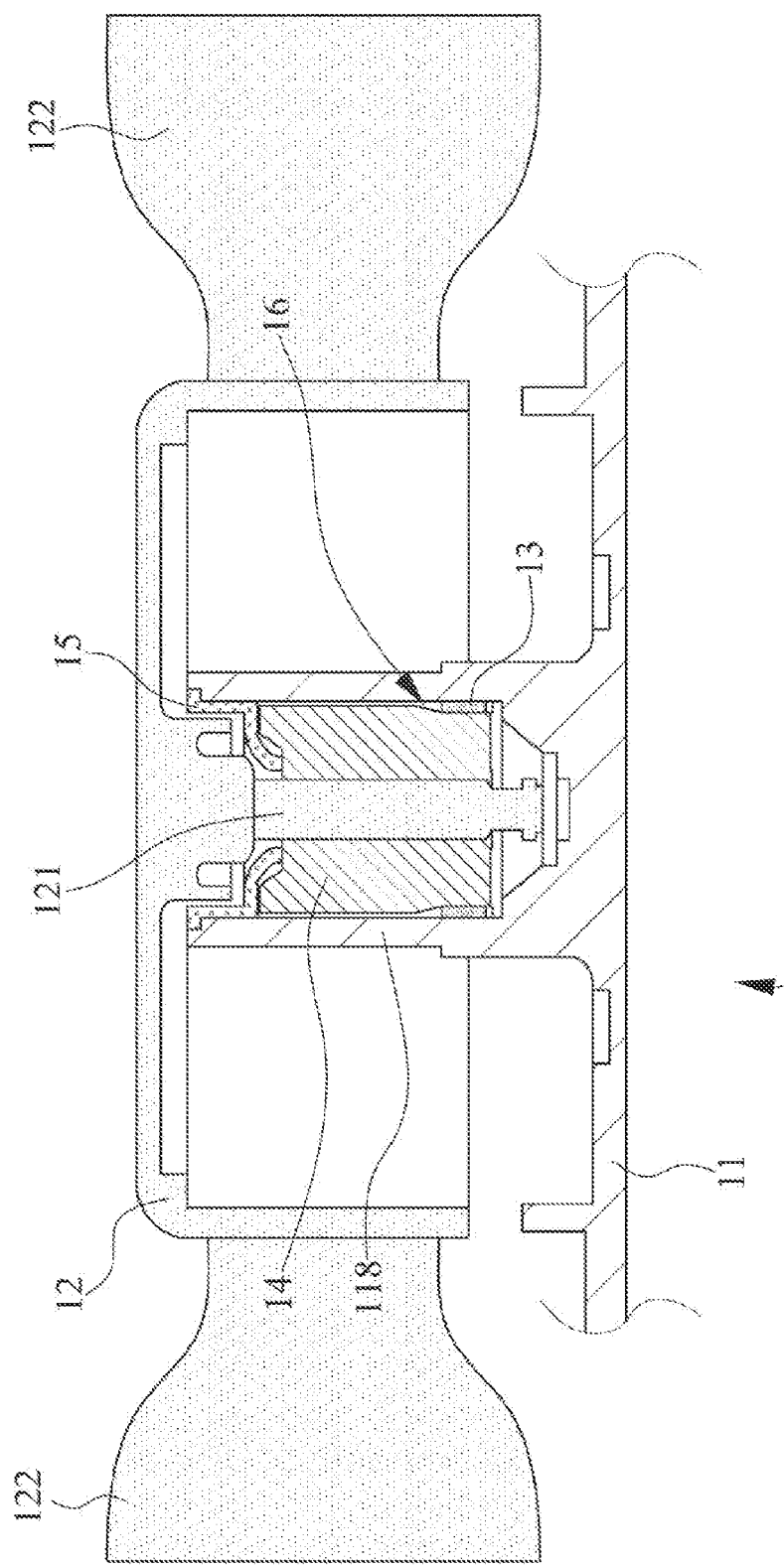
FIG. 2 is a sectional view of the preferred embodiment of a bearing device according to the present invention.
Figure 3:
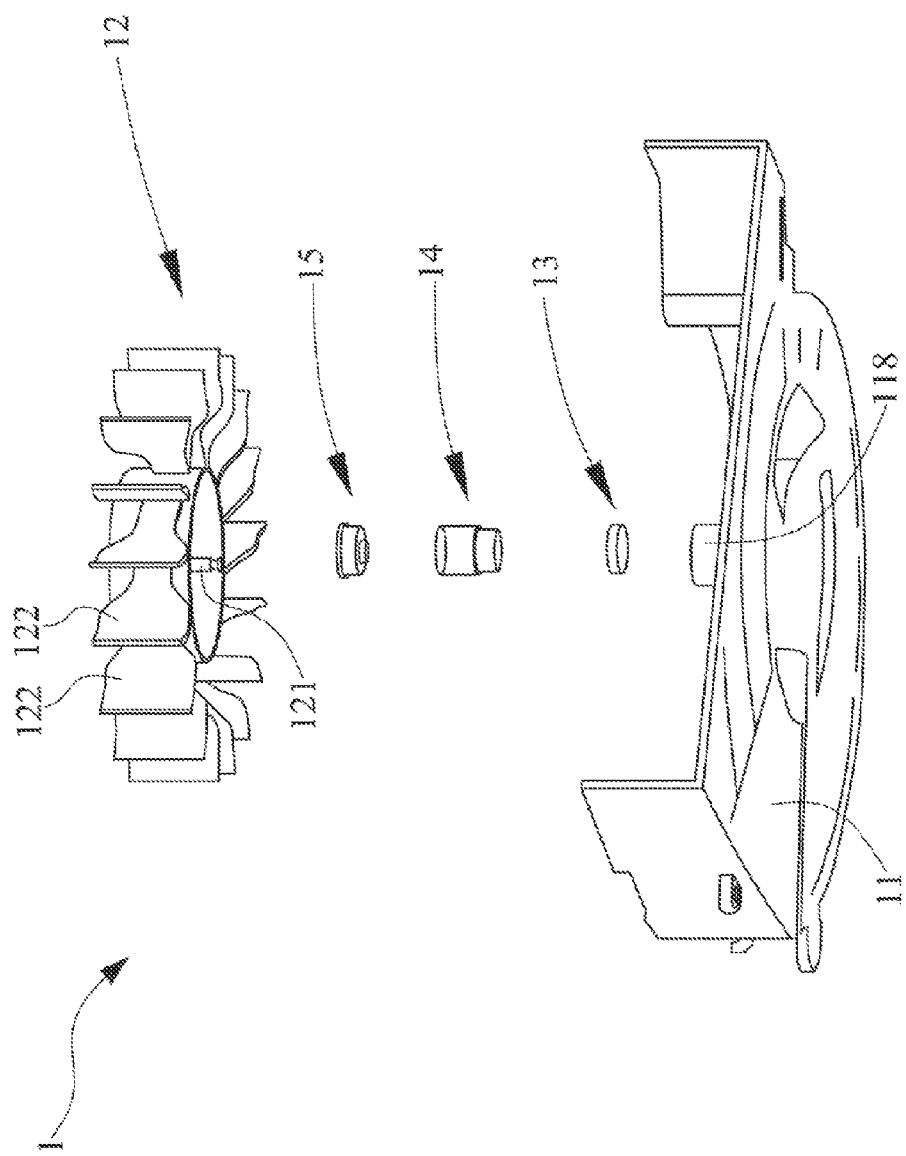
FIG. 3 is an exploded perspective view of the preferred embodiment of a bearing device according to the present invention.

Referring to FIGS. 2 and 3, the bearing device 1 according to the present invention is employed for a fan in an electronic device. The bearing device 1 includes a bearing fixing base 11, a hub 12, an oil seal bush 14 and a ring-shaped oily felt 13. The bearing fixing base 11 is fixedly joined with a tubular support 118 which extends upward from the bearing fixing base 11 to support a rotor spindle 121. Preferably, the bearing fixing base 11 is integrally made with a tubular support 118 to form a single piece for being easily fabricated and intensifying mechanical strength thereof. The bearing device 1 performs a fan of electronic device, and the bearing fixing base 11 with the tubular support 118 is fixedly disposed in the electronic device as an immovable part in the electronic device. The hub 12 is disposed above the bearing fixing base 11 and the tubular support 118, the spindle 121 extends downward from the hub 12, and a plurality of blades 122 radially extend outward from the circumference of the hub 12. In general, the hub 12, the spindle 121 and the blades 122 are integrally made as a single piece such that easy fabrication and intensified mechanical strength can be obtained. The spindle 121 extends into the tubular support 118, and rotates with the hub 12 and the blades 122 with respect to the center of the tubular support 118. The oil seal bush 14 is disposed between the spindle 121 and the tubular support 118, and a receiving clearance 16 is defined between the oil seal bush 14 and the tubular part 118 to contain the oily felt 13. In the preferred embodiment, the receiving clearance 16 is arranged at the outer side of the lower reduced-diameter end of the oil seal bush 14. It is noted that the receiving clearance 16 can be arranged at the outer side of the upper end of the oil seal bush 14 instead. In this way, the felt 13, which is disposed in the receiving clearance 16, is capable of supplying the lubrication oil. The lubrication oil distributes the inner and outer wall surfaces of the oil seal bush 14 due to capillary action so as to reduce friction resistance resulting from rotations of the spindle 121 and the oil seal bush 14. Thus, the bearing device 1 acts as the fan in the electronic device to blow air and dissipate heat generated from the electronic device such that noise during the rotation of the fan is reduced, and the life span of the bearing device 1 is prolonged.

Next, in order to secure the internal part of the bearing device 1 without being affected by external dusts and to prevent the lubrication oil from volatizing, a cap seal 15 is fixedly disposed at the upper axial end of the tubular support 118; it can be seen in FIG. 2 that the cap seal 15 has a annular side tightly sealed with the inner surface of the tubular support 118 with a cone-shaped side extending from the annular side to the upper end of the oil seal bush to form an immovable structure. Preferably, the cap seal 15 is attached to the tubular support 118 with welding; alternatively, snapping, riveting, adhering, embedding or locking can be utilized instead for the cap seal 15 being attached to the tubular support 118. As a result, the receiving clearance 16 is blocked and sealed with the cap seal 15 to prevent the lubrication oil in the receiving clearance 16 from volatizing and leaking, and the external dusts from entering the internal part of the bearing device 1. The configuration and position of the cap seal 15 shown in FIG. 3 is exemplary, other shapes or modifications without violating the spirit of the present invention can be used instead. For instance, the cap seal 15 and the bearing fixing base 11 can be arranged to hold two axial ends of the oil seal bush 14 respectively, and the receiving clearance 16 can be disposed at an axial end of the oil seal bush opposite to the cap seal 15; these are transitions are within a scope of the spirit of the present invention. Therefore, the bearing device 1 according to the present invention is capable of overcoming the deficiencies of the prior art such that the dusts are unable to enter the bearing device 1, the volatilization and leakage of the lubrication oil in the bearing device 1 are reduced significantly, and the life span of the bearing device 1 is prolonged substantially.

Referring to FIG. 3 again, when the bearing device 1 of the present invention is assembled, the spindle 121 of the hub 12 passes through the cap seal 15, the oil seal bush 14, and the oily felt 13 for the spindle being disposed at the common center of the cap seal 15, the oil seal bush 14, and the oily felt 13 to simply complete the assembly due to the bearing fixing base 11 with the tubular support 118 being immovable. Finally, the cap seal 15 is fixedly joined to the tubular support 118 with welding, snapping, riveting, adhering, embedding, locking, or the like.

It is appreciated from the preceding description that the bearing device according to the present invention is able to solve problems resulting from the conventional bearing device, reduce volatilization of the lubrication oil, and prolong the life span of the bearing device. When the bearing device of the present invention is used as the fan of the electronic device, it is capable of keeping the rotational speed thereof constantly, and incapable of increasing the noise thereof and generating vibrations caused by unbalancing running of the fan due to wear and tear of the spindle.

While the invention has been described with referencing to the preferred embodiment thereof, it is to be understood that modifications or variations may be easily made without departing from the spirit of this invention, which is defined by the appended claims.

What is claimed is:

1. A bearing device comprising:
    a bearing fixing base being fixedly joined with a tubular support which extends from the fixing base and has an open end;
    a hub being fixedly joined with a rotor spindle which extends into the tubular support and rotates with respect to the tubular support;
    an oil seal bush with a reduced-diameter end being disposed between the spindle and the tubular support with a receiving clearance being defined between the reduced-diameter end of the oil seal bush and the tubular support;
    a ring-shaped oily felt being disposed in the receiving clearance and sandwiched between the tubular support and the oil seal bush;
    a cap seal having an annular side fixedly joined to the inner surface of the open end of the tubular support and a cone-shaped side extending from the annular side to another end of the oil seal bush;
    wherein the oily felt is disposed next to the bearing fixing base to be opposite to the cap seal disposed at the open end of the tubular support to supply lubrication oil to lubricate the oil seal bush.

2. The bearing device as defined in claim 1, wherein the hub is disposed at an outer side of an end of the tubular support.

3. The bearing device as defined in claim 1, wherein the cap seal and the bearing fixing base hold two ends of the oil seal bush respectively.

4. The bearing device as defined in claim 1, wherein the bearing fixing base is integrally made with the tubular support.

* * * * *